United States Patent [19]
Duff

[11] 3,821,495
[45] June 28, 1974

[54] SIGNAL LOOP TESTING APPARATUS

[75] Inventor: Thomas Guy Duff, New Shrewsbury, N.J.

[73] Assignee: Bell Telephone Laboratories, Incorporated, Murray Hill, N.J.

[22] Filed: Dec. 26, 1972

[21] Appl. No.: 318,082

[52] U.S. Cl................. 179/175, 179/175.3, 324/133
[51] Int. Cl............................................... H04b 3/46
[58] Field of Search.......... 179/175, 175.1 R, 175.3, 179/175.25; 324/133, 72

[56] References Cited

UNITED STATES PATENTS

| | | | |
|---|---|---|---|
| 2,956,229 | 10/1960 | Henel | 179/175 |
| 3,538,268 | 11/1970 | Cochran | 179/175.25 |
| 3,711,661 | 1/1973 | Garrett et al. | 179/175.1 R |
| 3,729,597 | 4/1973 | Garrett et al. | 179/175 |

*Primary Examiner*—Kathleen H. Claffy
*Assistant Examiner*—Douglas W. Olms
*Attorney, Agent, or Firm*—W. Ryan; J. S. Cubert

[57] ABSTRACT

A circuit for simultaneously monitoring and signaling a plurality of signal loop conditions which utilizes a variable threshold voltage device to measure an electrical potential difference across a signal loop. The device develops output signals as a function of both threshold setting and measured potential difference. The output signals are indicative of polarity change (battery reversal), continuity failure, and other loop conditions.

8 Claims, 3 Drawing Figures

SIGNAL LOOP TESTING APPARATUS

FIELD OF THE INVENTION

This invention relates to communications switching system supervision. More particularly, the present invention relates to apparatus in a communications switching system for monitoring the signaling conditions indicative of signal loop use and integrity.

The term "signal loop" is used herein to designate a two-wire communications path. Thus, the term is not restricted in meaning to that common in the telephone art designating the communications path between a telephone subscriber station and a local telephone office.

BACKGROUND OF THE INVENTION

A communications system can be generally characterized as a network of communications paths, or signal loops, interconnecting switching offices. The network is used to carry analog or digital communications data between the switching offices and to carry supervisory signals indicative of a plurality of loop conditions. Depending upon the complexity of the system, many paths through the network may be available to interconnect any two designated offices. The office initiating the data transmission typically assigns a signal loop to carry both data and supervisory signals.

The following conditions may exist on a signal loop and are indicated by supervisory signals.

First, the signal loop is either seized (assigned) by a switching office to be used for a specific data transmission, or idle (not assigned). In each of these two states one of two conditions prevails. In the idle state a signal loop is either available or unavailable. A signal loop is unavailable when either 1. loop continuity has failed, that is, if the loop breaks, is damaged, or is for some reason unable to carry communications data, or when
2. the loop is being used for testing purposes at the distant office to which it is linked.

If neither of these two situations exists, the idle loop will be considered available for seizure, that is, available for an assignment to carry data.

In the seized state a signal loop is either capable of communicating data or is unconnected. A signal loop is considered unconnected when either 1. loop continuity has failed in the seized state, or
2. the transmission of data has not commenced on an assigned loop due to the loop not being fully closed as, for example, when the receiving equipment at the distant end of the loop is not turned on.

If neither of these latter two situations exists, the seized loop is considered capable of transmitting data, that is the loop is closed and is continuous.

PRIOR ART

Circuits exist in the prior art to monitor and indicate the conditions reflected by supervisory signaling. However, these circuits prove to be less than optimal in the context of modern electronic switching systems, typified by the No. 1 ESS described in the *Bell System Technical Journal*, Volume 43, Number 5, Parts 1 and 2, Sept. 1964, in terms of speed, reliability, and cost.

The prior art includes circuits for monitoring certain condition changes on a signal loop by detecting the reversal of battery polarity. A representative circuit is shown in *Notes on Distance Dialing*, published by the American Telephone and Telegraph Company, 1956.

The prior art also includes test sets which may be used to monitor circuit continuity. Such test sets are typified by that described in U.S. Pat. No. 3,538,268 issued on Nov. 3, 1970 to A. S. Cochran.

Devices which serially connect a continuity monitoring circuit to a reverse battery detection circuit are known to exist. However, the known arrangements of polarity reversal detection and continuity monitoring circuits do not simultaneously detect polarity reversals and continuity failures. Furthermore, the prior art polarity reversal detection and continuity monitoring circuits typically include sensitive polar mercury relay devices. These devices cause the prior art circuitry to operate at relatively slow operating speeds. These operating speeds are not, therefore, consistent with the speeds involved in the efficient use of modern electronic switching equipment. In addition, polar mercury relay circuitry is more expensive and less reliable than modern solid state circuitry as used in the present invention.

It is therefore an object of the present invention to provide an improved monitoring and signaling arrangement for indicating the integrity and availability of a preselected communications path in a communications system.

It is also an object of this invention to provide a less complex arrangement for monitoring and signaling the integrity and availability of a preselected signal loop in a communications system.

It is a further object of this invention to reduce the time required to detect the integrity and availability of a preselected signal loop in a communications system.

Further objects of the present invention are to provide a more economical and more reliable arrangement for monitoring and signaling the integrity and availability of a signal loop.

SUMMARY OF THE INVENTION

These and other objects of the present invention are attained in an illustrative embodiment in which a monitoring and signaling arrangement is connected to an outgoing trunk in a telephone switching toll office.

In addition to being connected to an outgoing trunk, the monitoring and signaling arrangement is connected to a toll office signal processor. The design, construction and use of such a signal processor is now well known in the art and comprises no part of the invention. Briefly, however, the processor's operation in the context of this invention will be described below.

With respect to the present invention, the processor performs two functions. First, it generates signals which are sent to the monitoring and signaling arrangement indicative of whether or not a trunk is seized. Second, the signal processor ultimately identifies the trunk condition being signaled by the monitoring signaling arrangement. This identification is accomplished by correlating the condition signal sent by the monitoring and signaling arrangement with data stored at the signal processor indicating whether or not the trunk is seized.

The preferred embodiment of the monitoring and signaling circuit in accordance with the present invention comprises the combination of a resistive network, a controlling transistor and a differential operational amplifier (OpAmp). Suitable devices for use in accord with the invention are the Fairchild 741C operational amplifier and the Fairchild EN722 transistor.

Thresholds used to identify particular loop conditions are established at the operational amplifier by modifying its "voltage offset." the voltage offset of an operational amplifier is, as usual, defined to be the value of differential voltage input required to produce an output signal halfway between the power supply voltages for the amplifier. The combination of the resistive network and the controlling transistor is an example of means for modifying the amplifier's voltage offset. The details of how the voltage offset is modified and how new threshold levels are established are deferred until the detailed description of the invention herein.

One feature of this invention is the provision of an arrangement that simultaneously detects polarity change (battery reversal) and testing activity of, or continuity failure in, a signal loop.

Another feature of this invention is the provision of an arrangement which generates a signal indicative of loop integrity and availability.

Still another feature of this invention is its combined economy and reliability.

A further feature of this invention is a reduction in the time required to determine signal loop integrity and availability by performing polarity-reversal detection and continuity monitoring simultaneously.

DETAILED DESCRIPTION

Figure 1:
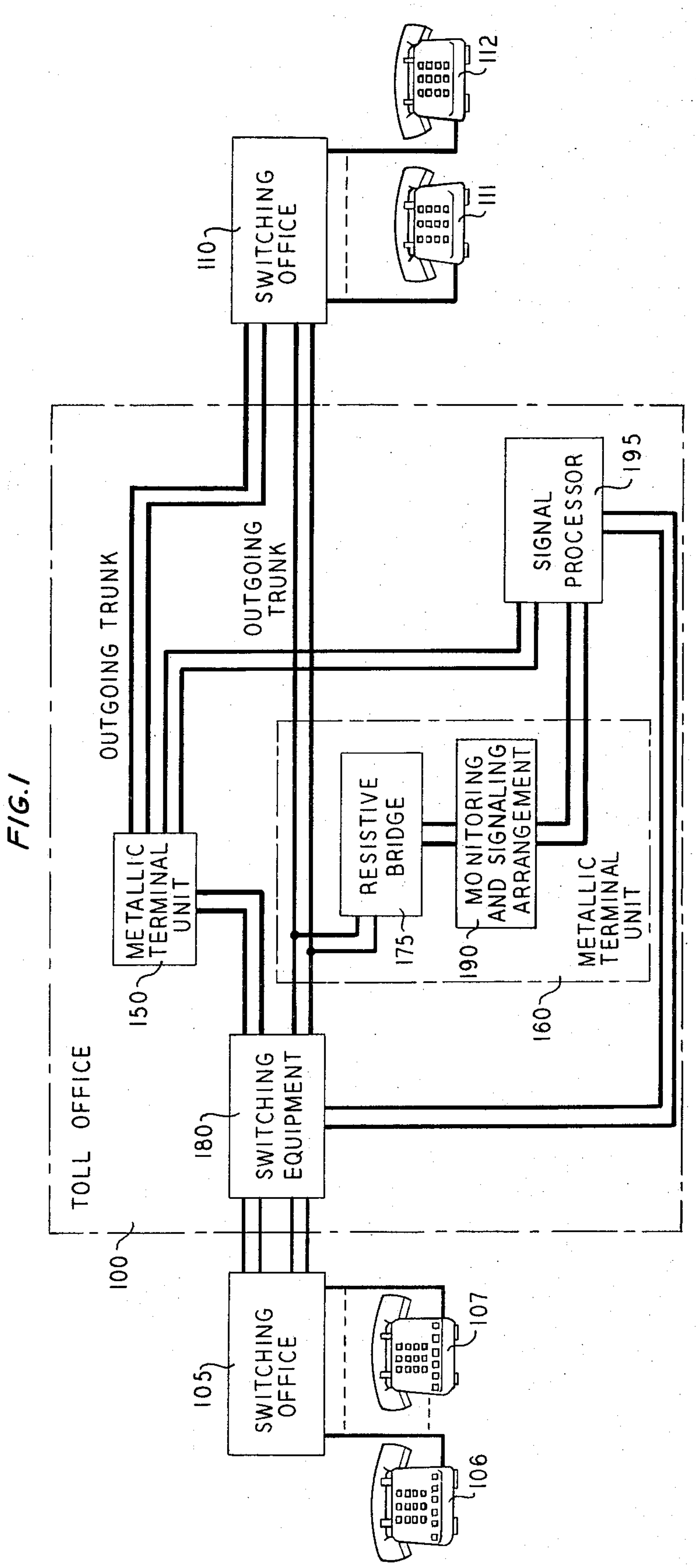
FIG. 1 is a block diagram of a representative telephone switching system including the novel monitoring and signaling arrangement in accordance with the present invention.

Referring now to FIG. 1, a portion of a telephone switching system is depicted in block diagram form and includes toll office 100 and interconnecting switching offices 105 and 110. Offices 105 and 110, being of standard design, provide service to typical respective subscriber stations 106, 107, 111, and 112.

The toll office includes a set of substantially identical metallic terminal units indicated by blocks 150 and 160 in FIG. 1. Each metallic terminal unit provides an interface with an outgoing communications path, called a trunk line, to a distant switching office. Metallic terminal unit 160 is shown in some detail and includes resistive bridge 175 and monitoring and signaling arrangement 190.

Also located at toll office 100 is signal processor 195 which, among other things, signals monitoring and signaling arrangement 190 to indicate whether the trunk controlled by the given metallic terminal unit is seized or idle.

Monitoring the signaling arrangement 190, built in accordance with this invention, is used for monitoring trunk conditions, generating signals indicative of observed trunk conditions, and sending these signals to signal processor 195. The monitoring and signaling arrangement operates in both the idle and seized state of the trunk line.

Resistive bridge 175 is merely a network of resistive components for scaling voltages down from the normal 48-volt potential difference across a trunk to the millivolt range so that the trunk may be monitored by sensitive solid-state devices. Resistive bridge 175 may be of any desired standard construction in accord with the differential voltage scale down requirements of a given network.

Signal processor 195 is also a prior art telephone switching device typified by the No. 1 ESS signal processor described in *The Bell System Technical Journal*, Volume 43, Number 5, Parts I, II and III, Sept. 1964.

For completeness, the balance of the telephone switching equipment located at a toll office is depicted as switching equipment 180 in FIG. 1. This equipment is unrelated to the workings of the present invention except that signal processor 195 is shown connected into the network through the switching equipment.

As a whole, all of the devices depicted in FIG. 1 except for the monitoring and signaling arrangement portion of the toll office may be found in prior art telephone systems.

Figure 2:
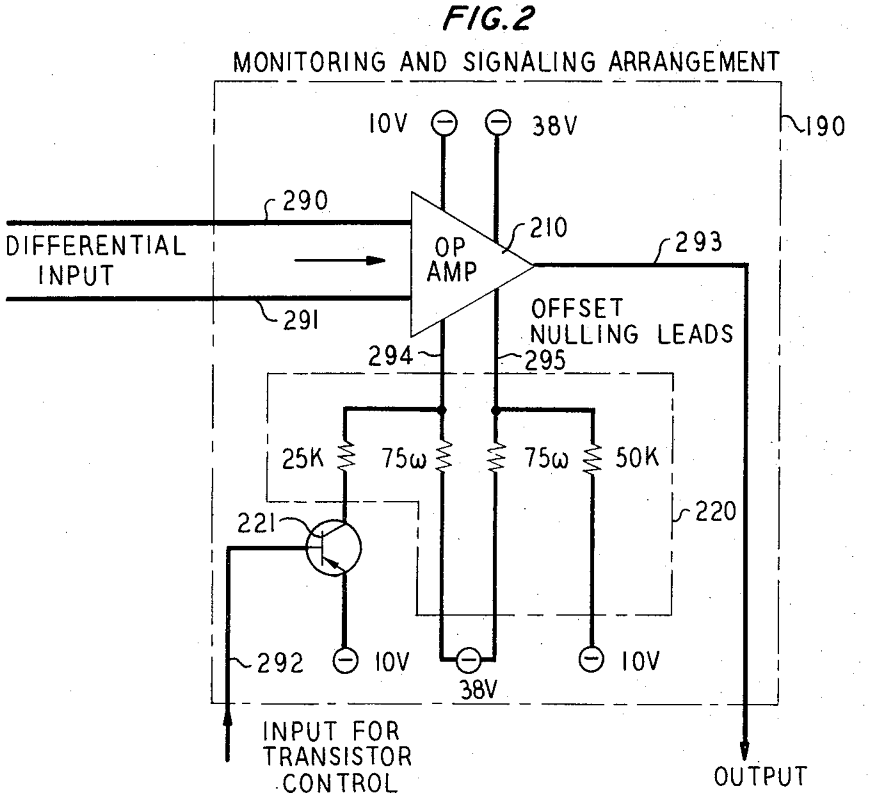
FIG. 2 displays the circuit details of one embodiment of the monitoring and signaling arrangement.

In accordance with the preferred embodiment of this invention, monitoring and signaling arrangement 190 comprises, in combination (as shown in FIG. 2), operational amplifier 210, transistor 221 and resistive network 220. Amplifier 210 is used as a differential voltage detection device. Transistor 221 in conjunction with resistive network 220, is used to intentionally build offset into amplifier 210 in response to signals indicating whether a selected loop is in an idle or seized condition as determined by processor 195.

An example of a suitable transistor in accordance with this invention, as stated above, is the Fairchild EN722 transistor. Also, as stated above, an example of a suitable operational amplifier in accordance with this invention is the Fairchild 741C. However, for a clearer understanding of the principles of the invention, a functionally equivalent amplifier is depicted in FIG. 2. It is not necessary to specify a particular amplifier to understand the principal operation of the present invention. Any amplifier substantially similar to the 741C amplifier, i.e., characterized by having inverting and noninverting inputs for a differential voltage, a pair of offset nulling leads, and a single output lead, may be used. In fact, the invention may be built by using the typical amplifier depicted in FIG. 2, the Fairchild amplifier, or any other amplifier possessing similar characteristics. It would be obvious to those skilled in the art that the values used in connection with the amplifier shown in FIG. 2 may be easily adapted to the value used in connection with the Fairchild 741C or any other substantially similar amplifier.

As previously stated, the voltage offset of an operational amplifier is defined to be the value of differential voltage input required to produce an output signal halfway between the power supply voltages for the amplifier. This is to say that a "null" signal is output from the amplifier, where a null signal is defined to be a signal that does not tend to saturate in the direction of either the positive or negative power supply voltages utilized. As is well known by those skilled in the amplifier art, a null output occurs when certain internal currents in the amplifier are balanced. Factory-produced amplifiers generally possess slight internal current imbalances so that the usual property for an ideal OpAmp (having a null output produced for a zero differential input) cannot be realized without biasing the amplifier. The currents in an operational amplifier such as the amplifier depicted in FIG. 2 may be balanced by developing currents in the amplifier's offset nulling leads.

For the purpose of this invention, the nulling leads are utilized to build offset into the amplifier rather than to null the offset. In other words, a current imbalance is sought such that a differential voltage of a predetermined magnitude is required to produce a null output. Thus, a voltage offset threshold value is established according to the current imbalance built into the amplifier by current developed in the offset nulling leads.

The manner of developing the current in the offset nulling leads in accordance with this invention will now be described.

In response to the seizure-indicative signals generated by the signal processor, the resistive network controlling transistor will operate causing the resistive network to assume one of two states. Depending on the state of the network, one of two currents will be developed in each of the offset nulling leads to which the resistive network is attached which, as described above, will in turn cause one of two voltage offsets to be set in the amplifier.

The offset built into the amplifier by the resistive network is an effective threshold value since (1) a differential voltage less than the offset voltage will cause the amplifier to saturate in one direction; (2) a differential voltage greater than the offset voltage will cause the amplifier to saturate in the opposite direction; and (3) such directed saturation, correlated with the condition causing a given threshold to be set, accurately signals the distinct loop conditions described herein.

In general, the monitoring arrangement detects and signals threshold crossings which correspond to condition changes of the trunk. The arrangement operates in a manner to be described below.

Remaining in the telephone switching system context, the potential difference across a signal loop or trunk line is nominally 48 volts. As previously indicated, resistive bridge 175 scales this potential difference down to the millivolt range. Leads 290 and 291 in FIG. 2 carry the scaled-down voltages which serve as inputs to monitoring and signaling arrangement 190.

Suppose that the trunk to be monitored were in the idle, or unassigned state, with no lack of continuity and with no testing of it underway. Then, using the components of FIG. 2, the 48-volt potential difference across the trunk is, in a typical case, scaled down to approximately 64 millivolts. If, while in the last mentioned condition, the trunk suffers a continuity failure, the scaled-down differential voltage across leads 290 and 291 will generally fall to between 0 and 25 millivolts depending on the type of break. For definition, suppose the continuity failure caused a 10 millivolt differential to occur across leads 290 and 291. Then, since amplifiers of the type depicted in FIG. 2 typically have an intrinsic voltage offset of approximately 5 millivolts or less, the continuity failure would not cause an offset threshold crossing. As previously indicated, upon an offset threshold crossing, the direction of saturation of the operational amplifier output is reversed. Thus, with no threshold crossing the signal emitted from the amplifier would remain the same and the trunk condition change would go unnoticed.

Note that if the amplifier had a higher voltage offset, for example 50 millivolts, the amplifier would saturate in one direction for an idle, unassigned trunk with good continuity and would saturate in the opposite direction for an idle, unassigned trunk with an inherent continuity failure. Thus, for the instant example given, it is desirable to change the factory-established offset of amplifier 210 and set it at a new level.

Similarly, to facilitate the detection of the other loop conditions described herein, it is desirable to dynamically set the offset level of amplifier 210. As stated above, varying the current flowing in the offset nulling leads will cause the amplifier's offset setting to be varied. This property of the amplifier permits a new offset level to be created dynamically by the monitoring arrangement. The way in which the monitoring arrangement causes the current flowing on offset nulling leads 294 and 295 to be changed is described below in detail.

FIG. 2 shows a 75 ohm resistor connected between offset nulling lead 294 and the −38 volt terminal of the power supply. Also shown connected to offset nulling lead 294 is a 25K ohm resistor connected in series with transistor 221 which in turn is connected to the −10 volt terminal of the power supply. FIG. 2 shows that transistor 221 may be turned on and off by signals on lead 292. Offset nulling lead 295 similarly has a 75-ohm resistor connected between the lead itself and the −38 volt terminal of the power supply. Finally, a 50K ohm resistor is shown connected between offset nulling lead 295 and the −10 volt terminal of the power supply.

In the telephone system context, transistor 221 is "off" when signal processor 195 signals the trunk as idle.

With transistor 221 "off," the current flowing on offset nulling lead 295 is reduced due to the current developed through the 50K-ohm resistor. In particular, the change in current flowing from the amplifier depicted in FIG. 2 would cause a threshold setting of between 25 and 64 millivolts to be established.

Thus, a continuity failure would now cause a change in the amplifier's direction of saturation and signal the change in trunk condition occasioned by the fault.

The following illustrates how a threshold value is changed. Suppose that lead 292 signals the loop as seized. This will cause transistor 221 to be turned on. As a result, current will flow through the 25K-ohm resistor as well as the 50K-ohm resistor (both shown in FIG. 2), and thus reduce the current in both leads 294 and 295 from amplifier 210. This variation in current from the operational amplifier establishes a new offset level and hence a new threshold value of the amplifier.

Based on the values used for resistors in FIG. 2, a threshold setting of +T with transistor 221 off would become −T when transistor 221 is turned on.

Thus, the transistor and resistive network combination depicted will allow different thresholds to be set in the amplifier depending on whether or not external conditions cause the transistor to be saturated.

The monitoring and signaling arrangement described may be utilized to detect the entire set of trunk conditions previously described herein as follows:

As stated before, the differential voltage across the trunk, given that the facility is idle and intact, is 48 volts. In addition, after being scaled down by resistive bridge 175, the differential voltage on leads 290 and 291 is approximately 64 millivolts. Choosing +T to be the threshold value and choosing +T such that it is between 25 and 64 millivolts, the 64 millivolt differential across leads 290 and 291 will cause amplifier 210 to saturate in a given direction creating a signal indicative of the loop being available for seizure. This signal is sent to processor 195 on lead 293.

If continuity fails, or if the loop is put into test use by the distant office, a +T threshold crossing occurs. This threshold crossing is in direct response to the voltage drop associated with either continuity failure as described above or the polarity change caused by test or other use of the trunk. This threshold crossing will cause amplifier 210 to saturate in the opposite direction thereby sending an unavailable loop signal to processor 195.

If the loop has been seized for use by the toll office, processor 195 will generate a signal causing transistor 221 in conjunction with resistive network 220 to change the threshold from +T to −T by changing the offset voltage of amplifier 210. The new threshold, −T, will be more negative then the voltage across the loop until a polarity reversal, indicating a closed loop, occurs. Upon polarity reversal, −T will be crossed and OpAmp 210 will respond by generating a signal indicative of the loop being in a condition for carrying data. This signal is sent to processor 195.

Suppose now that the loop is in the seized, capable-of-carrying data condition. While in this condition, a continuity failure, or polarity reversal indicative of disconnect due to the receiver being placed on-hook by the distant subscriber, will be indicated by a −T threshold crossing in the positive direction. Such a −T threshold crossing will cause a disconnected loop signal to be generated and sent to processor 195. Additionally, when a loop is disconnected by the receiver being placed on-hook at the originating end of the loop, +T is reestablished as the amplifier 210 threshold value via operation of transistor 221 in response to a signal, indicating an idle loop, generated by processor 195. If the facility is still intact, the loop is again signaled as available for seizure since +T will be exceeded. If, however, continuity had failed in the seized state causing the −T crossing, rather than a bona fide on-hook condition, +T would not be exceeded and the loop would revert to being signaled as unavailable.

Tables 1 and 2 below summarize the direction of saturation of the OpAmp output signal, ("Hi" when the saturation is positive with respect to the threshold setting and "Low" when the saturation is negative with respect to the threshold setting) relative to the instant thresholds in both the idle and seized loop states. As the tables show, and as the text above described in detail states, continuity and test-use determine OpAmp saturation direction in the idle loop state. In the seized state, continuity and the called subscriber being on- or off-hook (supervision) determines OpAmp saturation direction. Since whether or not testing is in progress and whether the called subscriber is on- or off-hook are both signaled by polarity changes on the loop, the OpAmp output signal clearly is a function of both continuity and polarity.

TABLE 1

| | OpAmp Saturation For Idle Loop Continuity | |
|---|---|---|
| Test use | Good Continuity | Continuity Failure |
| No Testing in Progress | Hi | Low |
| Testing in Progress | Low | Low |

TABLE 2

| | OpAmp Saturation for Seized Loop Continuity | |
|---|---|---|
| Supervision | Good Continuity | Continuity Failure |
| ON-Hook | Hi | Hi |
| OFF-Hook | Low | Hi |

The disclosed monitoring and signaling arrangement thus provides the signal processor in the toll switching office with signals indicative of the usage states or conditions of a trunk, simultaneously detecting polarity reversals and continuity failures in each of the trunk's possible states.

Figure 3:
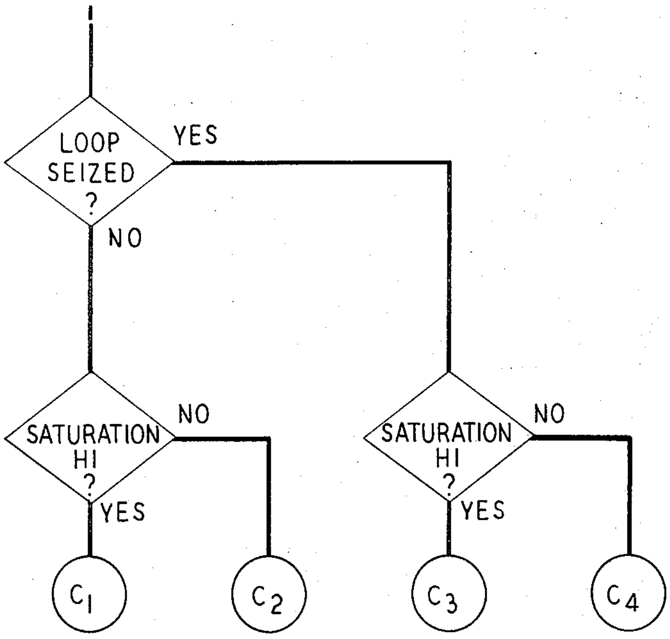
FIG. 3 is a flow chart representation of a machine operating sequence which correlates loop state with operational amplifier saturation direction and thereby identified loop condition.

The signal processor must now be able to correlate a signal being output by OpAmp 210 with the loop state (seized or idle) already known by the processor and stored in the processor's memory. FIG. 3 depicts a flow chart representation of a machine operation sequence for signal processor 195 which may be used for identifying the specific loop condition being signaled. This sequence may be controlled in an obvious manner by wired interconnections or may preferably be controlled by a stored program. The program corresponding to the flow chart depicted in FIG. 3 decides whether the signal loop was seized or idle. As indicated above, this data is always in the signal processor's memory. Next, once loop state is determined, the signal being output by the amplifier is tested for saturation direction. A determination of saturation direction, along with the a priori knowledge of whether the loop is idle or seized, uniquely determines the loop condition. This condition is then stored in the processor for use by other telephone equipment.

The flow chart shows the four possible conditions that are signaled in the telephone system described in detail herein, namely, $C_1$. that the loop is available for assignment.

$C_2$. that the loop is unassigned but is suffering from either a continuity failure or test use.

$C_3$. that the loop is assigned but is not closed and continuous.

$C_4$. that the loop is assigned, closed and continuous.

As a summary of the correlation and identification performed by the signal processor the gross loop conditions being signaled as determined by OpAmp saturation direction and loop state are presented in Table 3 below.

TABLE 3

| | Gross Loop Condition Signal Loop State | |
|---|---|---|
| OpAmp Saturation | Idle | Seized |
| Hi | $C_1$ | $C_3$ |
| Low | $C_2$ | $C_4$ |

It should be noted that signal processor 195 has storage, is capable of executing stored programs, and has a data memory. An example of such a signal processor is described in U.S. Pat. No. 3,408,628, issued to Brass et al., on Oct. 29, 1968, which is hereby incorporated by reference.

Although the arrangement described above has been couched in the context of a telephone switching system, it is to be understood that an arrangement in accordance with the principles in the invention may advantageously be utilized to detect and signal the integrity and availability of signal loops in any form of communications or control system and, hence, is not limited to use in a telephone switching system. Furthermore, it is to be understood that the elements disclosed in the specific embodiment described above are illustrative only and that other electronic components may be utilized in place of the electronic components disclosed in the illustrative embodiment. It is to be further understood that the above-described embodiment is illustrative of an application of the principles of the invention. Numerous other arrangements may be devised by those skilled in the art without departing from the spirit and scope of the invention.

What is claimed is:

1. Apparatus for generating signals indicative of which of a plurality of conditions exist on a signal loop, a first signal being carried on said signal loop, comprising:

a. control means for generating a first threshold signal whenever said signal loop is assigned and for generating a second threshold signal, mutually exclusive of said first threshold signal, whenever said signal loop is not assigned;

b. means responsive to said first threshold signal for setting a first threshold value, and responsive to said second threshold signal for setting a second threshold value, c. means for scaling said first signal, d. means, responsive to said first and second threshold values, for generating a first output signal whenever said scaled first signal exceeds the one of the first and second threshold values then set, and for generating a second output signal whenever said scaled first signal does not exceed the one of the first and second threshold values then set;

e. correlating means responsive to said first and second threshold signals and said first and second output signals, for generating a signal indicating a first loop condition whenever said first threshold signal and said first output signal exist concurrently, for generating a signal indicating a second loop condition whenever said first threshold signal and said second output signal exist concurrently, for generating a signal indicating a third loop condition whenever said second threshold signal and said first output signal exist concurrently, and for generating a signal indicating a fourth loop condition whenever said second threshold signal and said second output signal exist concurrently.

2. Apparatus in accordance with claim 1 wherein said control means comprises a. means for generating second signals indicating that said signal loop is assigned;

b. means for generating third signals indicating that said signal loop is not assigned;

c. said threshold signal generating means comprising means responsive to said second and third signals for generating said first threshold signal in response to said second signals and for generating said second threshold signal, mutually exclusive of said first threshold signal, in response to said third signals.

3. Apparatus in accordance with claim 2 wherein said control means comprises a. a programmable signal processor, having a data memory, for storing a first control data signal whenever said signal loop is assigned, for storing a second control data signal whenever said signal loop is not assigned, for generating, in response to said first control data signal, said second signals, and for generating, in response to said second control data signal, said third signals.

4. Apparatus in accordance with claim 3 wherein said first and second threshold value setting means comprises a. a resistive network for developing a first output current whenever said resistive network is in a first state, and for developing a second output current whenever said resistive network is in a second state, and b. a transistor for establishing said first state of said resistive network in response to said second signals, and for establishing said second state of said resistive network in response to said third signals.

5. Apparatus in accordance with claim 1 wherein said means responsive to said first and second threshold values comprises a differential operational amplifier having offset nulling leads.

6. Apparatus in accordance with claim 1 wherein said means responsive to said first and second threshold signals and said first and second output signals comprises a programmable signal processor, for generating a third control data signal indicating said first loop condition whenever said first threshold signal and said first output signal exist concurrently, for generating a fourth control data signal indicating said second loop condition whenever said first threshold signal and said second output signal exist concurrently, for generating a fifth control data signal indicating said third loop condition whenever said second threshold signal and said first output signal exist concurrently, and for generating a sixth control data signal indicating said fourth loop condition whenever said second threshold signal and said second output signal exist concurrently.

7. Apparatus in accordance with claim 1 further comprising means for storing program-control signals and wherein each of said control means and said correlating means comprises means responsive to said stored program-control signals.

8. A machine method for generating signals indicative of which of a plurality of conditions exist on a signal loop, a first signal being carried on said signal loop, comprising the steps of a. generating a first threshold signal whenever said loop is assigned;
b. generating a second threshold signal, mutually exclusive of said first threshold signal, whenever said loop is not assigned;
c. scaling said first signal,
d. setting a first threshold value responsive to said first threshold signal,
e. setting a second threshold value responsive to said second threshold signal,
f. generating a first output signal, in response to said first and second threshold signals, whenever said scaled first signal exceeds the one of said first and second threshold values then set;
g. generating a second output signal, in response to said first and second threshold signals, whenever said scaled first signal does not exceed the one of the first and second threshold values then set;
h. generating a signal, in response to said first and second threshold signals and said first and second output signals, indicating a first loop condition whenever said first threshold signal and said first output signal exist concurrently;
i. generating a signal, in response to said first and second threshold signals and said first and second output signals, indicating a second loop condition whenever said first threshold signal and said second output signal exist concurrently;
j. generating a signal, in response to said first and second threshold signals and said first and second output signals, indicating a third loop condition whenever said second threshold signal and said first output signal exist concurrently; and
k. generating a signal, in response to said first and second threshold signals and said first and second output signals, indicating a fourth loop condition whenever said second threshold signal and said second output signal exist concurrently.

* * * * *